(12) United States Patent
Hayashi

(10) Patent No.: US 8,520,099 B2
(45) Date of Patent: Aug. 27, 2013

(54) IMAGING APPARATUS, INTEGRATED CIRCUIT, AND IMAGE PROCESSING METHOD

(75) Inventor: Kenichi Hayashi, Nara (JP)

(73) Assignee: Panasonic Corporation, Osaka (JP)

( * ) Notice: Subject to any disclaimer, the term of this patent is extended or adjusted under 35 U.S.C. 154(b) by 259 days.

(21) Appl. No.: 13/087,399

(22) Filed: Apr. 15, 2011

(65) Prior Publication Data

US 2011/0279712 A1 Nov. 17, 2011

(30) Foreign Application Priority Data

May 14, 2010 (JP) ................................. 2010-112112

(51) Int. Cl.
*H04N 5/262* (2006.01)
(52) U.S. Cl.
USPC .......................................... 348/239; 382/299
(58) Field of Classification Search
USPC .......................................... 348/239; 382/299
See application file for complete search history.

(56) References Cited

U.S. PATENT DOCUMENTS

| | | | | |
|---|---|---|---|---|
| 6,046,772 A | * | 4/2000 | Howell | 348/273 |
| 7,486,318 B2 | | 2/2009 | Ohki | |
| 8,184,565 B2 | * | 5/2012 | Lim et al. | 370/311 |
| 2002/0126209 A1 | * | 9/2002 | Yamada et al. | 348/219 |
| 2005/0157949 A1 | * | 7/2005 | Aiso et al. | 382/299 |
| 2008/0298639 A1 | | 12/2008 | Tsunekawa et al. | |

FOREIGN PATENT DOCUMENTS

| | | |
|---|---|---|
| JP | 2005-38396 A | 2/2005 |
| JP | 2006-39628 A | 2/2006 |
| JP | 2006-60318 A | 3/2006 |
| JP | 4027441 B2 | 12/2007 |
| JP | 2008-294950 A | 12/2008 |
| JP | 2009-187429 A | 8/2009 |

\* cited by examiner

*Primary Examiner* — Tuan Ho
*Assistant Examiner* — Fayez Bhuiyan
(74) *Attorney, Agent, or Firm* — Shinjyu Global IP

(57) ABSTRACT

An imaging apparatus comprises an imaging element, an image selection unit, and an image compositing unit. The image selection unit selects, from among a plurality of image data pieces of the image data generated by the imaging element, a first image data piece and a second image data piece. The image selection unit selects, as the second image data piece, an image data piece generated with light from an object that is received via first pixels of the imaging element and received via second pixels of the imaging element for generating the first image data piece. The image compositing unit generates composited image data by compositing the first image data piece and the second image data piece.

8 Claims, 12 Drawing Sheets

| N | Image number I1 | Image number I2 | dx | dy | a | b | D | F |
|---|---|---|---|---|---|---|---|---|
| 0 | 0 | 1 | 1.14 | 0.24 | 0.14 | 0.24 | 0.28 | 1 |
| 1 | 0 | 3 | 2.56 | 0.30 | -0.44 | 0.30 | 0.53 | 1 |
| 2 | 0 | 9 | 5.13 | 1.63 | 0.13 | -0.37 | 0.39 | 1 |
| 3 | 1 | 2 | 3.91 | -1.09 | -0.09 | -0.09 | 0.13 | 0 |
| ..... | ..... | ..... | ..... | ..... | ..... | ..... | ..... | ..... |

FIG. 8

| −1 | −1 | −1 |
|----|----|----|
| −1 | 8  | −1 |
| −1 | −1 | −1 |

FIG. 11

IMAGING APPARATUS, INTEGRATED CIRCUIT, AND IMAGE PROCESSING METHOD

CROSS-REFERENCE TO RELATED APPLICATIONS

This application claims priority to Japanese Patent Application No. 2010-112112, filed on May 14, 2010. The entire disclosure of Japanese Patent Application No. 2010-112112 is hereby incorporated herein by reference.

BACKGROUND

1. Technical Field

The technology disclosed herein relates to an increase in the resolution of an imaging apparatus such as a digital still camera.

2. Background Information

In recent years, attention has been focused on so-called super-resolution technology, which is technology for improving the resolution of images handled by digital still cameras and digital televisions. A typical example of super-resolution technology is technology for generating one high-resolution image with use of a plurality of continuously captured images or consecutive frames in a moving image (e.g., see JP 2006-39628A and JP 2008-294950A, which are hereinafter referred to as "Patent Document 1" and "Patent Document 2" respectively). The temporally consecutive images are analyzed, and position shift of objects that has occurred between images is calculated. A high-resolution image is then estimated and generated by superimposing the frame images based on the calculated position shift.

However, with many digital still cameras, the pixels of the imaging element are generally provided with different-colored color filters arranged in a predetermined pattern in order to obtain color images. FIG. 12 shows an example of the pattern of a Bayer array imaging element, which is often used in digital still cameras, and as shown in FIG. 12, there is a row in which a blue (B) filter and a green (G) filter are alternately arranged and a row in which a green (G) filter and a red (R) filter are alternately arranged, and these two rows are provided alternately. In this case, the pixels that receive green light, which has the greatest influence on resolution, are arranged in a hound's tooth configuration, and interpolation processing is performed for the pixels therebetween that cannot receive green light. For this reason, the image obtained from light that has passed through the green (G) filter is obtained at a lower sampling frequency than the sampling frequency of the imaging element. The sampling frequencies of the pixels that receive blue light and the pixels that receive red light are even lower. Accordingly, the resolution characteristics of the luminance component calculated from the images obtained by the three colors of filters are more degraded than the case where light is received by all of the pixels, as with a monochrome camera. In other words, there is the problem that the resolution characteristics degrade as a trade-off for obtaining color information.

Accordingly, in the images that are used, the resolution characteristics in the vicinity of the Nyquist frequency are more degraded than the characteristics of the lens optical system, and therefore even if pixel data for a high-resolution image is obtained by performing position correction, superimposition, and interpolation processing as in the disclosure of Patent Document 1, it is not possible to restore the resolution characteristics in the vicinity of the Nyquist frequency of the original image.

Also, with a technique of minimizing the evaluation function through a repetitive computation such as in Patent Document 2, degraded resolution can be expected to be restored to a certain extent, but such a technique is not practical due to the computation load being very high.

SUMMARY

An imaging apparatus disclosed herein includes an imaging element, an image selection unit, and an image compositing unit. The imaging element includes a plurality of first pixels that measure the amount of light of a first color that has been received by the first pixels and a plurality of second pixels that measure the amount of light of a second color that has been received by the second pixels. The first pixels and the second pixels are arranged in a predetermined pattern. The imaging element is configured to generate image data in which an object has been imaged. The image data has at least one of first color information regarding the first color and second color information regarding the second color. The image selection unit selects, from among a plurality of image data pieces of the image data, a first image data piece and a second image data piece in which a position of the object is shifted by a predetermined amount relative to a position of the object imaged in the first image data piece. The image selection unit selects, as the second image data piece, an image data piece generated with light from the object that is received via the first pixels of the imaging element and received via the second pixels of the imaging element for generating the first image data piece. The image compositing unit is configured to generate composited image data by compositing the first image data piece and the second image data piece based on the predetermined amount.

According to this imaging apparatus, the image selection unit selects, as the second image data piece, an image data piece generated with light from the object that is received via the first pixels of the imaging element and received via the second pixels of the imaging element for generating the first image data piece, and therefore the first image data piece and the second image data piece in which the position of the subject is shifted by a predetermined amount are selected. Also, the image compositing unit generates composited image data by compositing the first image data piece and the second image data piece based on the predetermined amount. This enables generating composited image data obtained by, for example, all of the pixels of the imaging element receiving light of a color that controls resolution, thus making it possible to improve resolution characteristics in the vicinity of the Nyquist frequency.

Accordingly, such an imaging apparatus enables realizing an increase in resolution while suppressing degradation in resolution characteristics caused by optical image sampling and signal processing, and furthermore keeping the computation load very low.

BRIEF DESCRIPTION OF THE DRAWINGS

Referring now to the attached drawings, which form a part of this original disclosure:

FIG. 8 shows an example of inter-image parameters according to Embodiment 1;

FIG. 11 shows an example of an HPF used in edge enhancement; and

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1. Embodiment 1

1.1 Configuration of Image Signal Processing Unit 1

Figure 1:
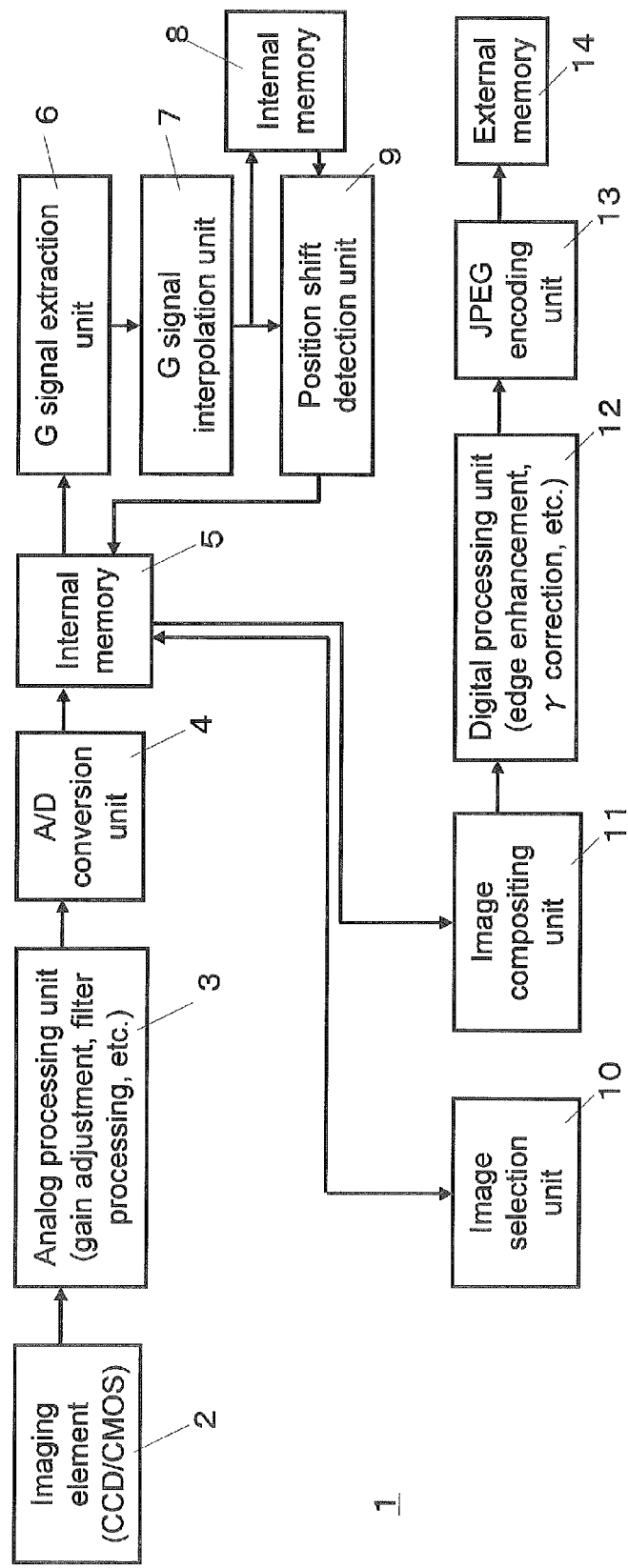
FIG. 1 is a block diagram of an image signal processing unit of a digital still camera according to Embodiment 1.

The following describes an imaging apparatus according to Embodiment 1 of the present invention with reference to FIGS. 1 to 12. FIG. 1 is a block diagram of an image signal processing unit 1 of a digital still camera serving as the imaging apparatus of Embodiment 1. Below is a description of the configuration shown in this block diagram and operations of the blocks.

As shown in FIG. 1, the image signal processing unit 1 included in the digital still camera of Embodiment 1 includes an imaging element 2, an analog processing unit 3, an A/D conversion unit 4, an internal memory 5, a G signal extraction unit 6, a G signal interpolation unit 7, an internal memory 8, a position shift detection unit 9, an image selection unit 10, an image compositing unit 11, a digital processing unit 12, a JPEG encoding unit 13, and an external memory 14.

Figure 12:
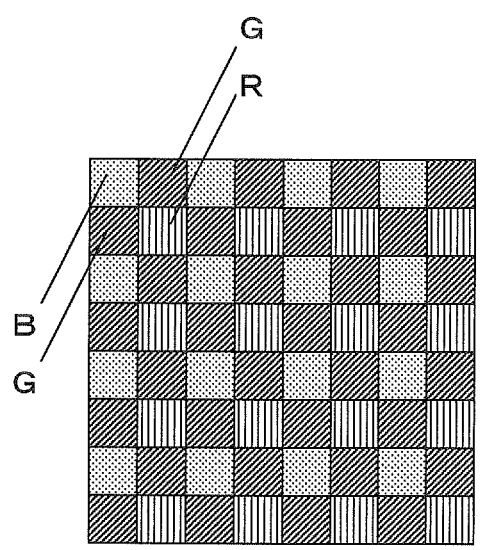
FIG. 12 shows an example of the Bayer array pattern.

The imaging element 2 is a known device such as a CCD or CMOS that outputs an analog image signal from an optical image formed by an imaging optical system (not shown) using the photoelectric conversion effect. The imaging element 2 has color filters (RGB) in the Bayer array as shown in FIG. 12 in order to obtain color information.

The analog processing unit 3 performs, for example, filter processing on an analog image signal for gain adjustment and noise removal. The A/D conversion unit 4 converts an analog image signal into a digital image signal called a raw image (image data). The internal memory 5 is a RAM (Random Access Memory), for example, and temporarily stores raw images.

The G signal extraction unit 6 extracts, from a raw image, only signals from the pixels that receive green light. The G signal interpolation unit 7 interpolates the luminance of missing information pixels (pixels that received light of a color other than green in the digital image signal) in the G signal extracted image output from the G signal extraction unit 6, with use of information regarding surrounding pixels. The internal memory 8 is a memory such as a RAM, and temporarily stores, from among G signal interpolated images obtained by the interpolation processing, a reference G signal interpolated image that is the first to be input to a series of processing. The position shift detection unit 9 detects the amount of position shift between a G signal interpolated image output from the G signal interpolation unit 7 and the reference G signal interpolated image stored in the internal memory 8.

Based on the detected amount of position shift, the image selection unit 10 selects a group of two raw images that are most suited for compositing performed as resolution increase processing. The image compositing unit 11 composites the selected raw images.

The digital processing unit 12 performs image quality enhancement processing on an image, such as edge enhancement processing and γ correction processing. The JPEG encoding unit 13 encodes an image into the JPEG format. The external memory 14 is a recording medium such as an SD card, and stores a completed image in the JPEG format.

Among the units of the image signal processing unit 1, the analog processing unit 3, the A/D conversion unit 4, the G signal extraction unit 6, the G signal interpolation unit 7, the position shift detection unit 9, the image selection unit 10, the image compositing unit 11, the digital processing unit 12, and the JPEG encoding unit 13 may be configured by an integrated circuit such as an LSI.

1.2 Operation of Image Signal Processing Unit 1

Figure 2:
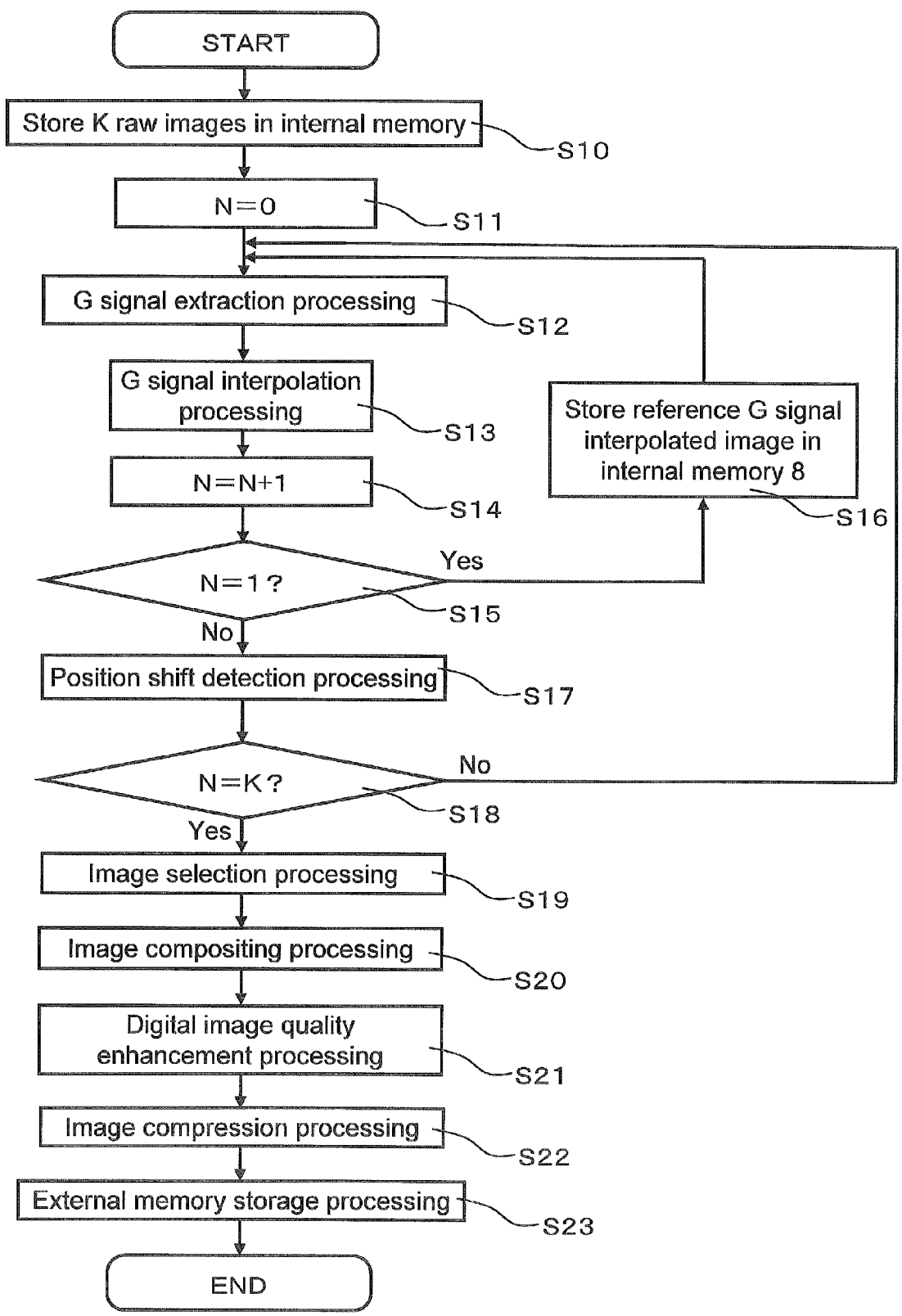
FIG. 2 is a flowchart showing image signal processing performed by the digital still camera according to Embodiment 1.

FIG. 2 is a flowchart showing image signal processing performed by the image signal processing unit 1 of the digital still camera according to Embodiment 1. The following describes details of operations of the processing blocks shown in FIG. 1 with reference to the image signal processing flowchart shown in FIG. 2.

1.2.1 Generation of Raw Images

Firstly, the digital still camera (not shown) performs continuous imaging K times in accordance with an imaging start instruction given by a user. As will be described later, the K images that were acquired are converted into raw images that are digital image signals and stored in the internal memory 5 (step S10 in FIG. 2). Here, K is an arbitrary natural number, and is appropriately determined with consideration given to, for example, the capacity of the internal memory 5 and the processing time required by post-processing that is acceptable to the user. Here, K is assumed to be "10".

Next is a description of processing performed from imaging to the storage of raw images.

An analog image signal is output from an optical image formed by an imaging optical system (not shown) using the photoelectric conversion effect given by the imaging element 2, and then input to the analog processing unit 3. The analog processing unit 3 performs analog signal processing such as gain adjustment and noise removal on the analog image signal output from the imaging element 2. The A/D conversion unit 4 converts the analog image signal output from the analog processing unit 3 into a digital image signal called a raw image. The generated raw image is temporarily stored in the internal memory 5. As a result of repeating the above-described processing K times, K raw images are generated and stored in the internal memory 5.

At this stage, in accordance with the configuration of the color filters of the imaging element 2 shown in FIG. 12, assuming that the first row of each raw image is row number 1, the color information in the odd-numbered rows is arranged in the sequence BGBG and so on, and the color information in the even-numbered rows is arranged in the sequence GRGR and so on.

1.2.2 Position Shift Detection

Next, the raw images stored in the internal memory 5 are sequentially sent to the G signal extraction unit 6, the G signal interpolation unit 7, and the position shift detection unit 9, and processing for detecting the amount of position shift is performed with the first raw image being tentatively used as the reference raw image.

Firstly, a variable N for counting the number of times that position shift detection has been repeated is initialized to "0" (step S11 in FIG. 2). Thereafter, the G signal extraction unit 6 extracts only the G signal, which has the greatest influence on the luminance signal, and converts the other pixels to "0" (step S12 in FIG. 2). The G signal extracted image output from the G signal extraction unit 6 is sent to the G signal interpolation unit 7. The G signal interpolation unit 7 interpolates the pixels whose values were set to "0" in the processing performed by the G signal extraction unit 6, using the values of surrounding pixels (step S13 in FIG. 2). Specifically, the value of each of such pixels is set to the average of the values of pixels that are upwardly, downwardly, leftwardly, and rightwardly adjacent to the pixel. The image created in this way will hereinafter be referred to as a "G signal interpolated image".

Next, the counter variable N is incremented (step S14 in FIG. 2), and a determination is made as to whether the value of the counter variable N is "1" (step S15 in FIG. 2). If the determination result is "Yes", that is to say, if the G signal interpolated image is the first G signal interpolated image, it is stored in the internal memory 8 (S16 in FIG. 2). The first G signal interpolated image that is stored at this time is used as the reference G signal interpolated image by the position shift detection unit 9 that will be described later. Images other than the reference G signal interpolated image are directly sent to the position shift detection unit 9. An image other than the reference G signal interpolated image is hereinafter referred to as a "target G signal interpolated image" for distinction from the reference G signal interpolated image.

Next, the position shift detection unit 9 compares the target G signal interpolated image and the reference G signal interpolated image, and calculates an amount of position shift of the former relative to the latter (step S17 in FIG. 2). Specifically, one example of the method that can be used here is a pattern matching method, which is a known method.

Figure 3B:
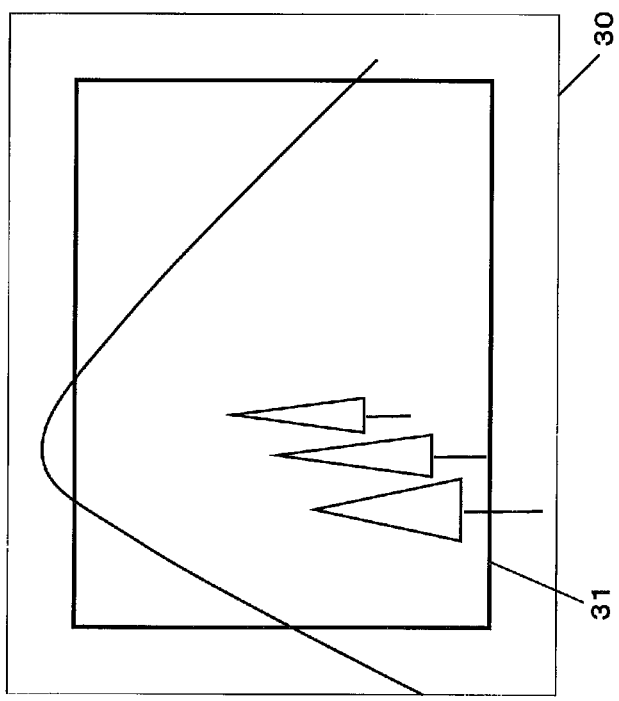
FIGS. 3A and 3B are diagrams for describing a position shift detection method.
Figure 3A:
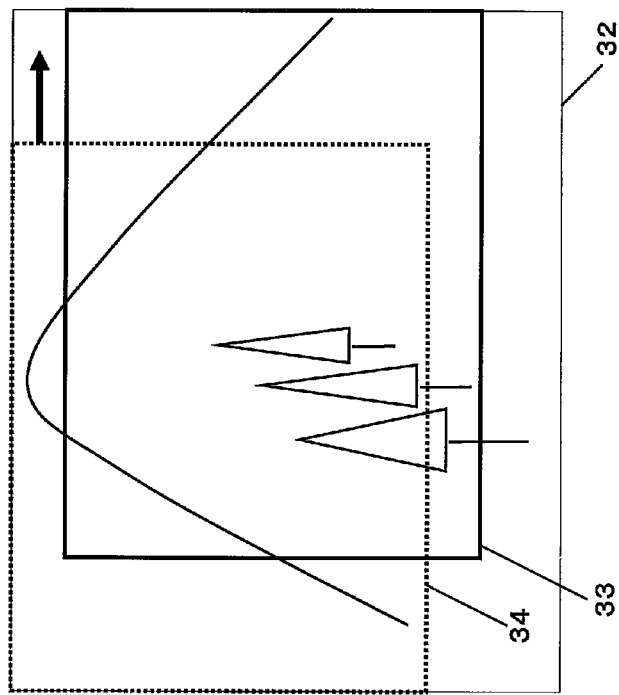

The following describes a position shift detection method employing the pattern matching method with reference to FIGS. 3A and 3B. FIG. 3A shows a reference G signal interpolated image 30, and FIG. 3B shows a target G signal interpolated image 32. A template image region 31 is provided in the reference G signal interpolated image 30. Due to being one of a plurality of continuously captured images, the target G signal interpolated image 32 includes features similar to those of the reference G signal interpolated image 30. In view of this, the amount of position shift is obtained by searching the target G signal interpolated image 32 for a portion of features (best matching region 33) that substantially matches the template image region 31. In order to determine the best matching region 33, a matching region 34 is provided in the target G signal interpolated image 32 and scanned from the upper left to the lower right. An SAD (Sum of Absolute Difference) value, that is to say, the sum of the absolute values of differences between corresponding pixel values in the template image region 31 and the matching region 34 is obtained for the matching region 34 at each scan position, and the matching region 34 at the position at which the SAD value is the lowest is determined to be the best matching region 33. Furthermore, position shift detection with sub-pixel precision is achieved by performing function fitting such as parabolic function fitting on the SAD values obtained in the best matching region 33 and the periphery thereof, and obtaining the position at which the result of the function is the lowest. The amount of position shift detected by the position shift detection unit 9 is stored in the internal memory 5.

Next, a determination is made as to whether the counter variable N matches the total number of raw images K (step S18 in FIG. 2). A determination result of "No" means that a raw image for which position shift detection processing has not ended exists, and therefore in this case, the procedure returns to step S12, and position shift detection processing is performed on the next raw image. If the determination result is "Yes", the procedure advances to the next processing, which is image selection processing.

1.2.3 Image Selection Processing

Figure 4A:
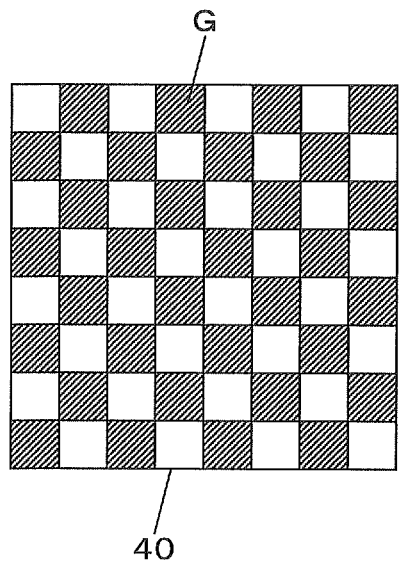
FIGS. 4A and 4B are diagrams showing processing for compositing G signal extracted images.
Figure 4A:
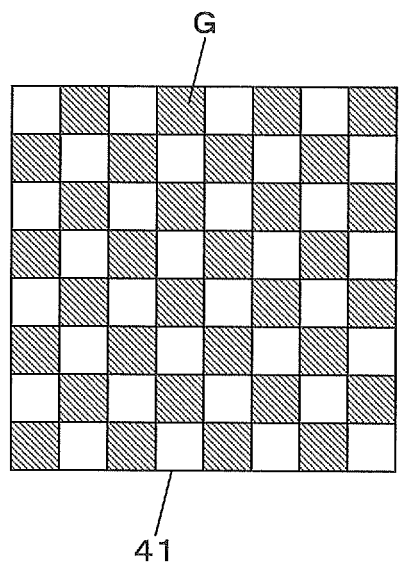
Figure 4B:
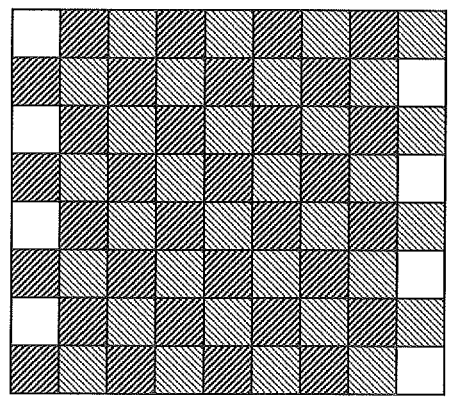

The image selection unit 10 selects two raw images that are to be used in image compositing processing for increasing resolution (step S19 in FIG. 2). Here, later-described inter-image parameters are calculated. In the present embodiment, two images are composited such that the G signal pixels, which exist in only the hounds-tooth configuration in one image regardless of having a large degree of influence on the resolution of the image, exist in all pixels. In other words, the resolution is improved by compositing two images such that, as shown in FIGS. 4A and 4B, the G signal pixels (pixels with diagonal hatching) of a reference G signal extracted image 40 and the G signal pixels (pixels with diagonal hatching) of a target G signal extracted image 41 do not overlap each other. Expressions 1 and 2 below show conditions for preventing overlapping, where dx [pixels] represents the amount of position shift in the left-right direction of the screen, and dy [pixels] represents the amount of position shift in the up-down direction of the screen.

$$dx=2m+1, dy=2n \text{ (m, n: integer)} \quad \text{(Expression 1)}$$

$$dx=2m, dy=2n+1 \text{ (m, n: integer)} \quad \text{(Expression 2)}$$

The inter-image position shift calculated here occurs due to camera shake. It is therefore uncertain what kind of position shift will occur, and in actuality there are almost no cases where the values of "dx" and "dy" are integers such that Expression 1 or 2 is satisfied. In view of this, Expressions 1 and 2 are respectively modified to Expressions 3 and 4 below.

$$dx=2m+1+a, dy=2n+b \text{ (m, n: integer, } -0.5<a, b<0.5) \quad \text{(Expression 3)}$$

$$dx=2m+a, dy=2n+1+b \text{ (m, n: integer, } -0.5<a, b<0.5) \quad \text{(Expression 4)}$$

Here, "dx" and "dy" can be used in the following expressions to obtain "a" and "b".

$$a=dx-\text{Round}(dx) \quad \text{(Expression 5)}$$

$$b=dy-\text{Round}(dy) \quad \text{(Expression 6)}$$

Note that "Round( )" is assumed to be a function for rounding off the input value.

Also, the following expression is assumed to be the condition according to which "dx" and "dy" satisfy Expressions 3 and 4.

$$(\text{Round}(dx)+\text{Round}(dy))\%2 \neq 0 \quad \text{(Expression 7)}$$

Note that "%" is assumed to be a remainder operator.

The image selection unit 10 performs calculation according to Expressions 5 to 7 on all of the amounts of position shift between raw images (assumed to be the same as the amounts of position shift between corresponding G signal interpolated images), and determines whether Expression 7 is satisfied.

The values of "a" and "b" in the case where Expression 7 is satisfied are used to obtain an evaluation variable D defined by Expression 8.

$$D=(a^2+b^2)^{0.5}$$ (Expression 8)

One of the two raw images is treated as the reference raw image, the other is treated as the target raw image, and the position of the target image relative to the reference image when a=b=0 (i.e., when the amount of position shift between the two raw images substantially corresponds to an odd number of pixels) is called the ideal position. The evaluation variable D at this time corresponds to the actual distance between the target image position and the ideal position. The combination of raw images for which "D" is the smallest is selected.

Figure 7:
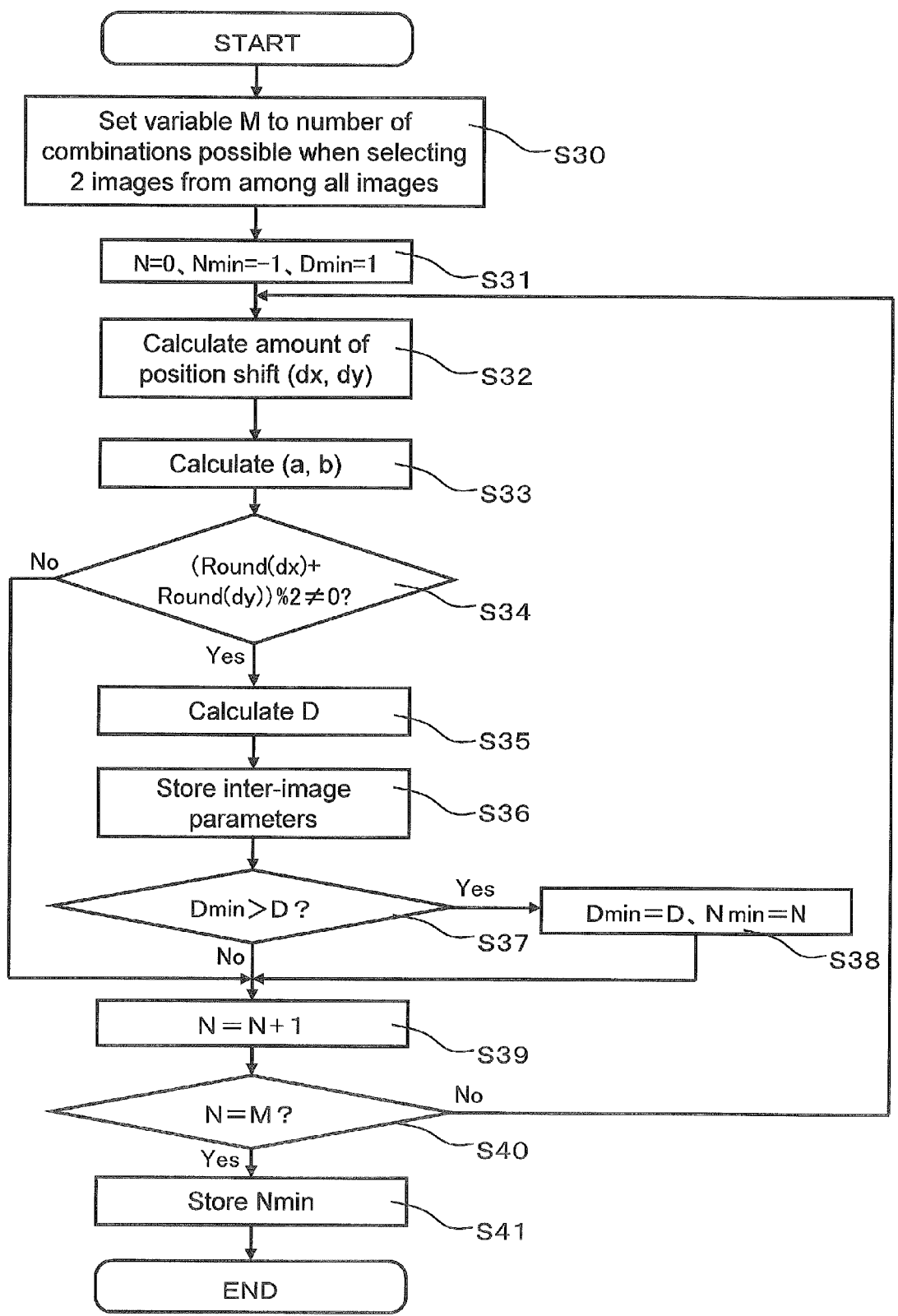
FIG. 7 is a flowchart showing image selection processing according to Embodiment 1.

The following is a detailed description of the processing procedure performed by the image selection unit 10 with reference to the image selection processing flowchart shown in FIG. 7. The image selection unit 10 starts the processing upon receiving the (K−1) position shift amount detection results obtained by the position shift detection unit 9 from the internal memory 5.

Firstly, the total number of images K is used to calculate the number of combinations M that are possible when selecting two arbitrary raw images from among all of the raw images (step S30). For example, in the case where K=10, that is to say, 10 images were acquired as continuously captured images, 45 combinations are possible when selecting two images from among the 10 images, and therefore M=45. Next, the counter variable N, a variable Dmin, which stores the lowest value of the evaluation variable D, and a variable Nmin, which stores the value of the counter variable at which the evaluation variable D was the lowest value, are initialized (step S31). Thereafter, processing is sequentially performed on all of the combinations of raw images.

Firstly, the amount of position shift between two raw images selected as processing targets is calculated based on the (K−1) position shift amount detection results received from the internal memory 5 (step S32). The position shift detection unit 9 only has detected the amount of position shift of the target raw image relative to the first tentative reference raw image. In view of this, the amount of position shift between the raw images is calculated based on the position shift detection result obtained when using that tentative reference raw image as the reference.

Next, "a" and "b" are calculated using Expressions 5 and 6 (step S33). Thereafter, evaluation using Expression 7 is performed (step S34). If the evaluation result is "No", that is to say, if the two raw images targeted for processing do not satisfy Expressions 3 or 4, the procedure skips to step S39. If the evaluation result is "Yes", the evaluation variable D is calculated in accordance with Expression 8 (step S35).

Next, the thus-calculated values of the inter-image parameters "dx", "dy", "a", "b", and "D" are stored in the internal memory 5 along with the counter variable N and image numbers I1 and I2 of the two raw images (step S36). The image numbers referred to here are numbers for identifying individual raw images, and are assumed to be continuous integer values starting from zero that are allocated in the order in which the images were captured. An evaluation result F of "Round(dx)%2≠0" is also stored along with the above values. The evaluation result F is used in later processing for determining which of the Expressions 3 and 4 is satisfied by the two raw images targeted for processing. It is assumed that the value of "1" is stored if the evaluation result F is "Yes", and the value of "0" is stored if the evaluation result F is "No".

FIG. 8 shows an example of the inter-image parameters that are stored.

Next, the calculated evaluation variable D and Dmin are compared (step S37), and "D" is substituted for Dmin if "D" is less than Dmin. Also, the counter variable N at that time is substituted for Nmin (step S38). Next, the value of the counter variable N is incremented by one (step S39). Thereafter, a determination as to whether the counter variable "N" matches "M" is made (step S40). If "N" and "M" do not match, the procedure returns to the processing of step S32, and processing is performed on the next two raw images. If "N" and "M" match, a determination that processing has ended for all of the combinations of raw images is made, thus escaping from this processing loop. Lastly, the value of Nmin is stored in the internal memory 5 (step S41).

As a result of the processing described above, a final reference raw image (first image data) and a target raw image (second image data) are selected.

1.2.4 Image Compositing Processing

The image compositing unit 11 reads out the results stored by the image selection unit 10 in the internal memory 5 and determines the final reference raw image and the target raw image. The image compositing unit 11 then performs compositing processing as shown in FIGS. 4A to 6E, using these two determined raw images (step S20 in FIG. 2).

Figure 9:
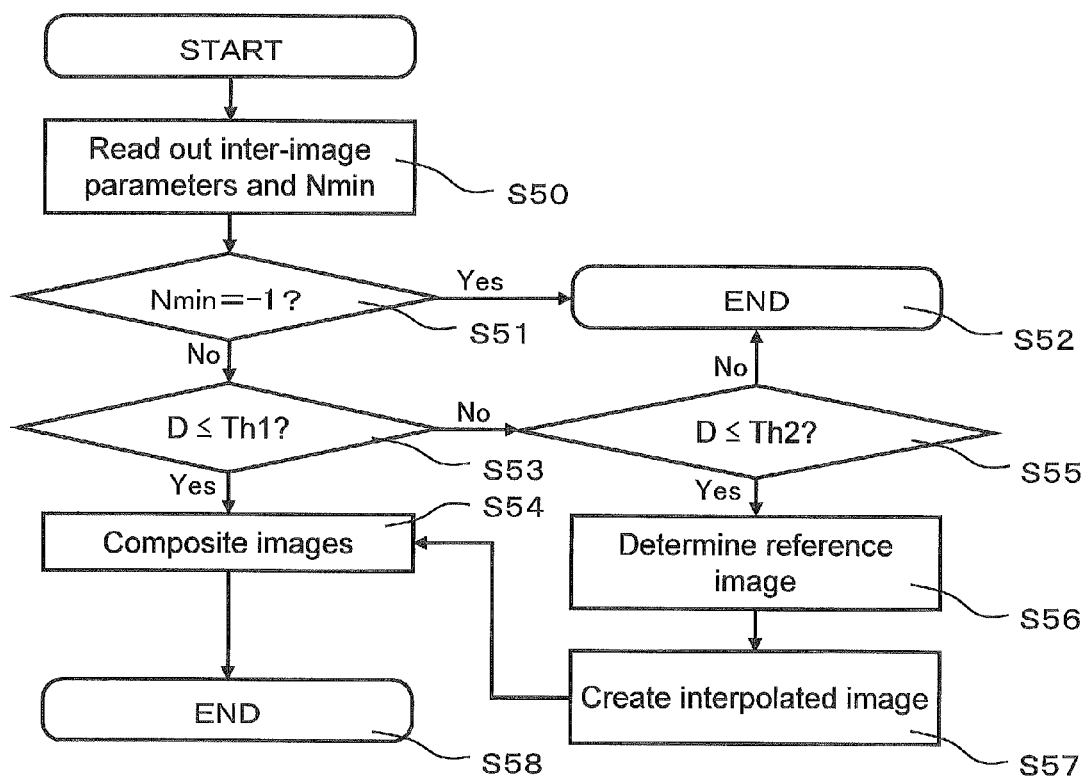
FIG. 9 is a flowchart showing image compositing processing according to Embodiment 1.

The following is a detailed description of the processing procedure performed by the image compositing unit 11 with reference to the image compositing processing flowchart shown in FIG. 9. Firstly, the inter-image parameters and the value of Nmin are received from the internal memory 5 (step S50). Next, a determination is made as to whether the Nmin is "−1" (step S51). The value of "−1" for Nmin means that no combination of images satisfied Expression 7 in the processing performed by the image selection unit 10, that is to say, no images were selected by the image selection unit 10. In this case, compositing processing cannot be performed, and the processing ends here (step S52). Note that at this time, an error display indicating the fact that image processing could not be performed appropriately may be displayed on a display unit (not shown) of the imaging apparatus, such as an LCD (Liquid Crystal Display).

If Nmin is "−1", the procedure advances to the next step, and a determination is made regarding the value of the evaluation variable D (distance from the ideal position) (steps S53 and S55). Specifically, if the evaluation variable D is less than or equal to a threshold value Th1, a determination is made that "D", which corresponds to the amount of position shift from the ideal position, is sufficiently small so as to substantially not be a problem and can be ignored. Then, compositing processing is performed using one of the two raw images as the reference raw image, and using the other one as the target raw image (step S54). This compositing processing will be described later.

If the evaluation variable D is greater than the threshold value Th1 and furthermore less than or equal to a threshold value Th2, a determination is made that "D" cannot be ignored, that is to say, the two selected raw images cannot be used as they are in compositing processing (step S55). An interpolated image is created with use of a raw image other than the two selected raw images as well, and the created interpolated image is used in the compositing processing. To accomplish this, firstly one of the two raw images is determined to be the reference raw image (step S56). The two selected raw images are the candidates for the reference image. Between these two raw images, the one that is included in more groups that satisfy Expression 7 compared to the other one is determined to be the reference raw image.

Specifically, assuming that the image numbers of the two raw images are SI1 and SI2, the inter-image parameters read out in step S50 are referenced, the number of groups of images in which SI1 is included as the image number I1 or I2 is counted as C1, and the number of groups of images in which SI2 is included as I1 or I2 is counted as C2. If C1 is greater than or equal to C2, the image SI1 is determined to be the reference image, and if C1 is less than C2, the image SI2 is determined to be the reference image. Hereinafter, the description is continued assuming that SU has been determined to be the reference image.

Next, an image (interpolated image) at the ideal position is created by applying an inverse distance weighting (IDW) method to all or some of the C1 target raw images that are selectable when the image SI1 is the reference raw image (step S57).

For example, in the IDW method, the values of interpolated pixel points are calculated in accordance with Expression 9, where $Z(j)$ represents arbitrary pixel data (an interpolated pixel point) of the interpolated image, $z(i, j)$ represents pixel data (a sample pixel point) of a plurality of target images corresponding to $Z(j)$, and $W(i, j)$ represents a weighting function that is in accordance with a distance $h(i, j)$ between the interpolated pixel point and the sample pixel point.

$$Z(j)=(\Sigma W(i,j) \cdot z(i,j))/\Sigma W(i,j) \qquad \text{(Expression 9)}$$

Here, "i" is an index indicating the target image. Also, "j" is an index indicating the interpolated pixel point.

Furthermore, "$\Sigma$" indicates the range of i=1 to C1. Moreover, $W(i, j)=1/h(i, j)^2$.

This interpolation processing obtains a target image at the ideal position. Note that although the weighting function $W(i, j)$ is assumed to be the inverse of the square of the distance $h(i, j)$ between the interpolated pixel point and the sample pixel point, there is no limitation to this.

Next, compositing processing is performed using the image SI1 as the reference raw image and the interpolated image as the target raw image (step S54). The details of this compositing processing will be described later.

On the other hand, if the evaluation variable D is greater than the threshold value Th2, the captured images are determined to not be appropriate for compositing and resolution increasing processing (step S55), and the compositing processing ends (step S52). At this time, an error display indicating the fact that image processing could not be performed appropriately may be displayed on a display unit (not shown) of the imaging apparatus, such as an LCD.

Note that the values of the threshold values Th1 and Th2 are arbitrary. Empirically, no problems arise if Th1 is less than or equal to 0.1 pixels. Of course, there is no limitation to this value.

Next, compositing processing is performed in step S54. This compositing processing needs to be performed separately for R, G, and B images. The following describes the processing performed separately for R, G, and B with reference to FIGS. 4A and 4B, FIGS. 5A to 5E, FIGS. 6A to 6E, and FIGS. 10A to 10C.

<Compositing Processing for G Signal Extracted Images>

Figure 10A:
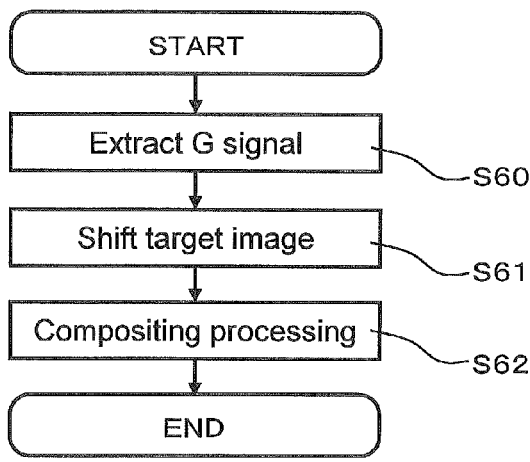
FIGS. 10A to 10C are flowcharts respectively showing R, G, and B image compositing processing according to Embodiment 1.
Figures 10B, 10C:
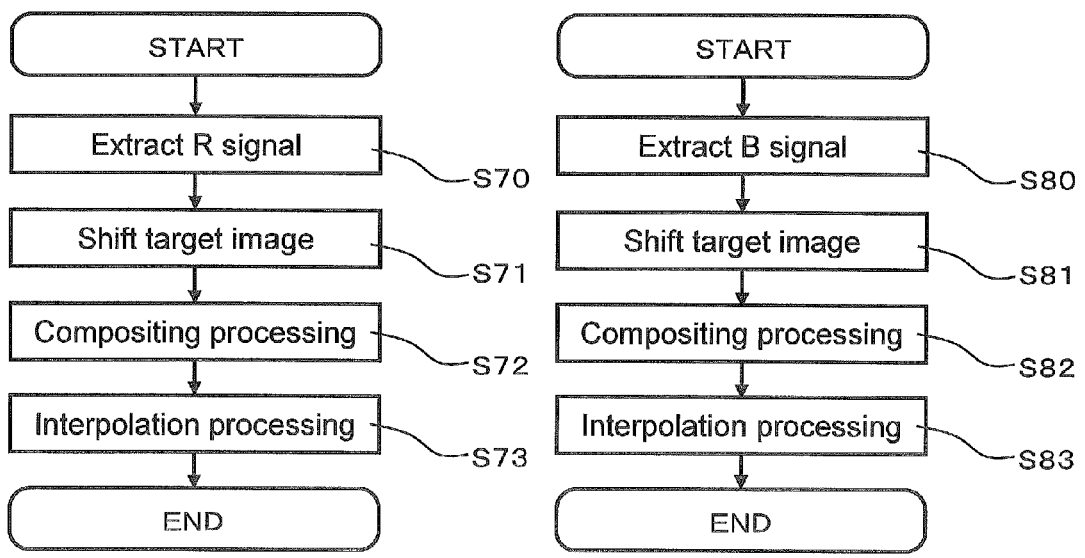

First is a description of compositing processing for G signal extracted images with reference to FIGS. 4A and 4B and FIG. 10A. As shown in FIGS. 4A and 4B, in the compositing processing for G signal extracted images, the data of the target G signal extracted image 41 is inlaid into the pixels in the reference G signal extracted image 40 that do not include data.

As shown in FIG. 10A, firstly only the G signal (first color information) is extracted from the reference raw image and the target raw image, and the other pixels are set to "0" (step S60). As a result, the reference G signal extracted image 40 and the target G signal extracted image 41 shown in FIG. 4A are obtained. Next, these two images are aligned (step S61). Here, the target G signal extracted image is shifted by (dx−a) pixels in the X direction and (dy−b) pixels in the Y direction relative to the reference G signal extracted image. Note that "dx", "dy", "a", and "b" are the inter-image parameters of the two corresponding selected images, that is to say, the reference G signal extracted image 40 and the target G signal extracted image 41. Next, compositing processing is performed (step S62). Here, the G signal pixels of the target G signal extracted image are copied to the reference G signal extracted image. As shown in FIG. 4B, this obtains an image having G signals for all of the pixels, excluding image peripheral portions where pixel data does not exist in the other image being composited due to the image shifting, that is to say, excluding compositing blank portions.

<Compositing Processing for R Signal Extracted Images>

Figure 5A:
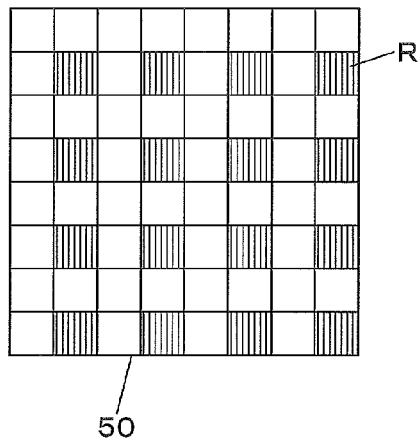
FIGS. 5A to 5E are diagrams showing processing for compositing R signal extracted images.
Figure 5A:
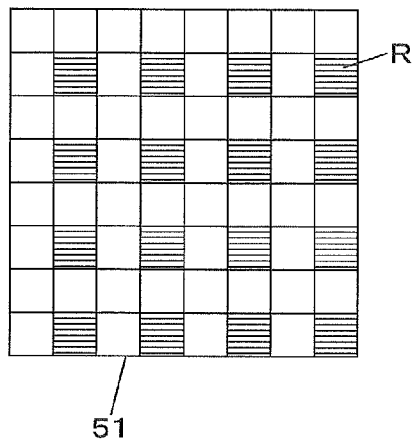
Figure 5B:
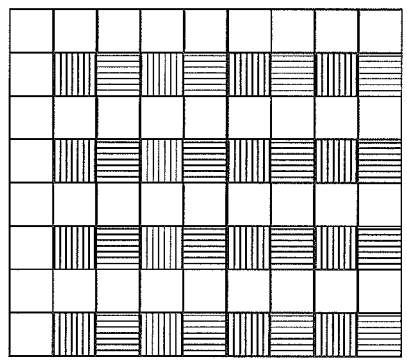
Figure 5C:
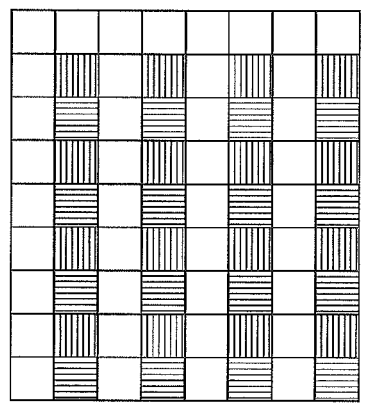

Next is a description of compositing processing for R signal extracted images with reference to FIGS. 5A to 5E and FIG. 10B. Firstly, only the R signal (second color information) is extracted from the reference raw image and the target raw image, and the other pixels are set to "0" (step S70). As a result, a reference R signal extracted image 50 and a target R signal extracted image 51 shown in FIG. 5A are obtained. Next, these two images are aligned (step S71). Here, similarly to the case of the G signal images, the target R signal extracted image is shifted by (dx−a) pixels in the X direction and (dy−b) pixels in the Y direction relative to the reference R signal extracted image. Next, compositing processing is performed (step S72). The R signal pixels of the target R signal extracted image are copied to the reference R signal extracted image. Unlike the case of the G signal, the composited image generated in this step can be as shown in FIG. 5B or FIG. 5C. In other words, attention needs to be paid to the fact that the arrangement of pixels not including data differs depending on whether Expression 3 holds or Expression 4 holds. If Expression 3 holds, the composited image is as shown in FIG. 5B. If Expression 4 holds, the composited image is as shown in FIG. 5C.

Figure 5D:
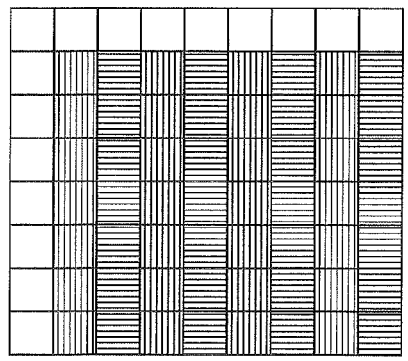
Figure 5E:
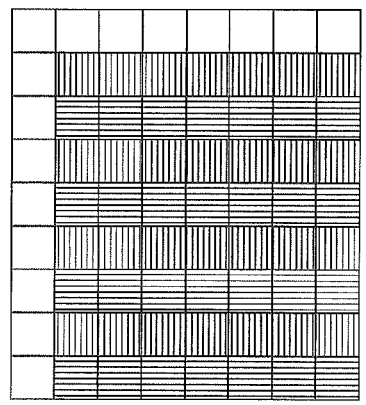

Next, interpolation processing is performed to eliminate pixels not including data (step S73). If Expression 3 holds, that is to say, if the inter-image parameter F is "1", interpolation processing is performed such that the value of each pixel not including data is set to the average of the values of the pixels above and below that pixel. As a result, the composited/interpolated image shown in FIG. 5D is obtained. If Expression 4 holds, that is to say, if the inter-image parameter F is "0", interpolation processing is performed such that the value of each pixel not including data is set to the average of the values of the pixels to the left and the right of that pixel. As a result, the composited/interpolated image shown in FIG. 5E is obtained.

<Compositing Processing for B Signal Extracted Images>

Figure 6A:
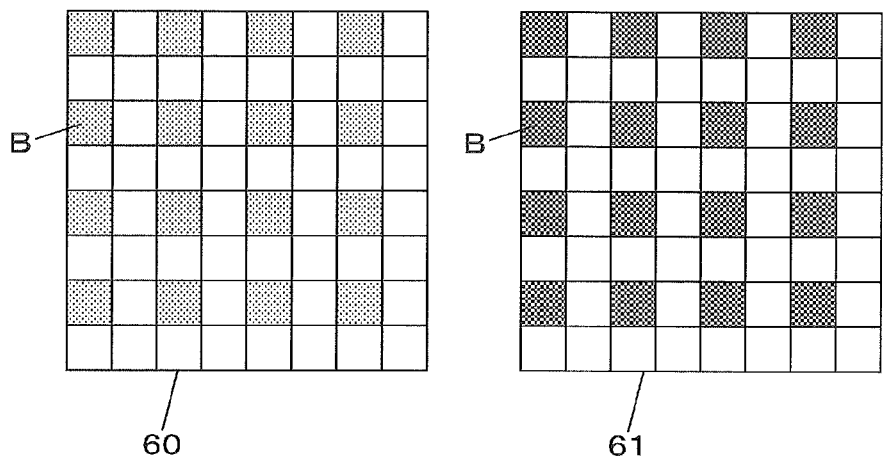
FIGS. 6A to 6E are diagrams showing processing for compositing B signal extracted images.
Figure 6B:
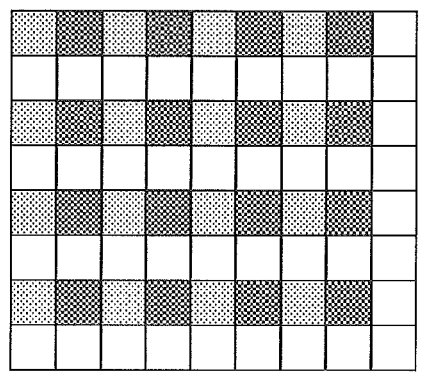
Figure 6C:
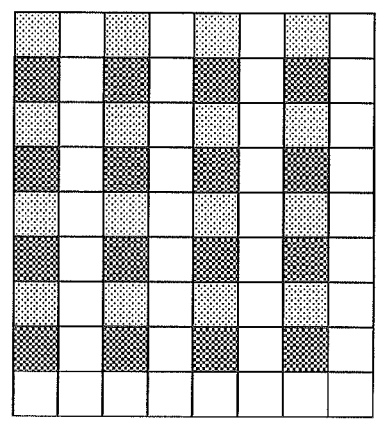

Next is a description of compositing processing for B signal extracted images with reference to FIGS. 6A to 6E and FIG. 10C. Firstly, only the B signal (second color information) is extracted from the reference raw image and the target raw image, and the other pixels are set to "0" (step S80). As a result, a reference B signal extracted image 60 and a target B signal extracted image 61 shown in FIG. 6A are obtained. Next, these two images are aligned (step S81). Here, similarly to the case of the G signal images, the target B signal extracted image is shifted by (dx−a) pixels in the X direction and (dy−b) pixels in the Y direction relative to the reference B signal extracted image. Next, compositing processing is performed (step S82). The B signal pixels of the target B signal extracted image are copied to the reference B signal extracted image. Similarly to the case of the R signals, the composited image generated in this step can be as shown in FIG. 6B or FIG. 6C. In other words, attention needs to be paid to the fact that the arrangement of pixels not including data differs depending on whether Expression 3 holds or Expression 4 holds. If Expression 3 holds, the composited image is as shown in FIG. 6B. If Expression 4 holds, the composited image is as shown in FIG. 6C.

Figure 6D:
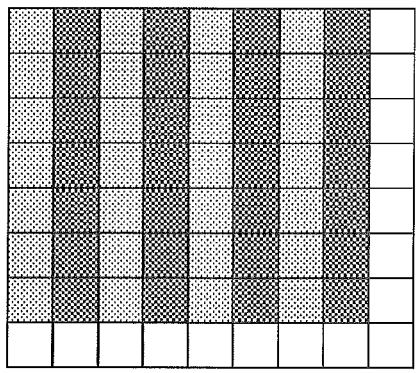
Figure 6E:
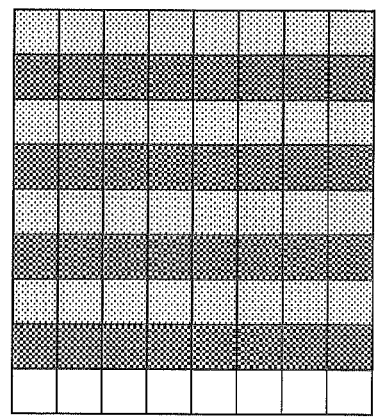

Next, interpolation processing is performed to eliminate pixels not including data (step S83). If Expression 3 holds, that is to say, if the inter-image parameter F is "1", interpolation processing is performed such that the value of each pixel not including data is set to the average of the values of the pixels above and below that pixel. As a result, the composited/interpolated image shown in FIG. 6D is obtained. If Expression 4 holds, that is to say, if the inter-image parameter F is "0", interpolation processing is performed such that the value of each pixel not including data is set to the average of the values of the pixels to the left and the right of that pixel. As a result, the composited/interpolated image shown in FIG. 6E is obtained.

The above processing obtains an image whose pixels all include G signals, an image whose pixels all include R signals, and an image whose pixels all include B signals, excluding compositing blank portions (regions where compositing could not be performed due to position shift between images, that is to say, regions at the ends of the images where pixel data is not included).

1.2.5 Other Image Processing

Next, the digital processing unit 12 performs digital image quality enhancement processing (step S21 in FIG. 2) on all of the pixel data of the separate R, G, and B images received from the image compositing unit 11. Examples of the processing include YC separation (luminance and color signal separation), edge enhancement, and γ correction.

In YC separation, a luminance signal Y and color difference signals Cb and Cr are obtained from the R, G, and B signals by, for example, performing the computation of Expressions 10 to 12 below.

$$Y = 0.299R + 0.587G + 0.144B \quad \text{(Expression 10)}$$

$$Cb = -0.172R - 0.339G + 0.511B \quad \text{(Expression 11)}$$

$$Cr = 0.511R - 0.428G - 0.083B \quad \text{(Expression 12)}$$

Figure 11:
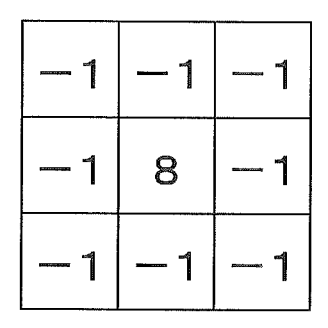

Also, in edge enhancement, a high-frequency component is extracted by, for example, applying an HPF such as that shown in FIG. 11 to the luminance signal Y. Edges can be enhanced by adding this high-frequency component to the original luminance signal Y.

Note that if the image compositing unit 11 has determined that all of the amounts of position shift between images are not suitable for compositing processing (i.e., in the case where "END" in step S52 is arrived at in the image compositing processing flowchart shown in FIG. 9), R, G, and B data for all pixels cannot be obtained. In this case, resolution increasing is abandoned, and conventional demosaicing processing is performed. In other words, an R signal extracted image, a G signal extracted image, and a B signal extracted image are created from the reference raw image, and R, G, and B data for all pixels is obtained by performing interpolation processing on the individual images.

The JPEG encoding unit 13 performs processing for encoding the image data received from the digital processing unit 12 into the JPEG (Joint Photographic Experts Group) format as image compression processing (step S22 in FIG. 2).

The encoded image data is then stored in the external memory 14 (step S23 in FIG. 2).

1.3 Features of Embodiment 1

In Embodiment 1, the imaging apparatus performs the above-described processing through the image selection unit 10 and the image compositing unit 11, and therefore even an imaging apparatus employing a single-chip imaging element having color filters can obtain G signal pixel data (green being the color that controls the resolution) for all pixels excluding compositing blank portions, thus enabling an improvement in resolution characteristics in the vicinity of the Nyquist frequency.

Also, due to the image selection unit 10 and the image compositing unit 11 performing processing in accordance with amount of position shift between images, when an ideal or a nearly ideal amount of position shift is obtained, it is possible to improve resolution characteristics in the vicinity of the Nyquist frequency without performing interpolation computation, optimization computation, or the like, which have a high computation load.

Furthermore, even in the case where the amount of position shift between images is high, the image compositing unit 11 performs image interpolation processing, thus enabling realizing a resolution improving effect.

1.4 Modifications

Although the imaging apparatus has been described taking the example of a digital still camera in the present embodiment, there is no limitation to this. For example, even in the case of a digital video camera that mainly handles moving images, an increase in resolution can be achieved by sequentially applying the processing described in the present embodiment to frames.

Although the imaging apparatus of the present embodiment is configured using the imaging element 2 having a Bayer array color filter, there is of course no limitation to this. It is sufficient for the various colors of the filter to be arranged in an arbitrary regular pattern such that the density of color information for each color can be increased by compositing images having a suitable amount of position shift therebetween.

Although the example in which the imaging element 2 employs a primary color filter has been given in the present embodiment, the imaging element may use a complimentary color filter (CMY). Effects similar to those of the embodiment described above are obtained even in the case of using a complimentary color filter.

Although the first captured raw image is set as the reference raw image in the present embodiment, there is no limitation to this. For example, a configuration is possible in which the amount of camera shake at the time of imaging is monitored by a gyrosensor (not shown) included in the digital still camera, and the raw image with the smallest monitored amplitude is used as the reference raw image. As a result, an image without blurring is selected as the reference raw image, thus making it possible to expect an improvement in the precision of measuring the amount of position shift.

Although the example in which the internal memory 5 and the internal memory 8 are independent memories is described in the present embodiment, there is no limitation to this. For example, no problems arise even if these memories are separate regions of one physical memory.

Although a pattern matching method is used as the position shift detection method in the present embodiment, there is no limitation to this. For example, it is possible to use a feature point tracking method in which a plurality of feature points such as intersections between edges are extracted from the reference image, and pixel points corresponding to the extracted feature points are searched for in the target image.

Although an inverse distance weighting (IDW) method is used as the interpolated image creation method in the present embodiment, there is no limitation to this. For example, it is possible to calculate data for an interpolated pixel point by performing spline interpolation on sample point data.

Although the example in which the image compositing unit 11 generates a G signal composited image, an R signal composited/interpolated image, and a B signal composited/interpolated image, and outputs them to the digital processing unit 12 has been described in the present embodiment, there is no limitation to this. For example, the image compositing unit 11 may generate only the G signal composited image. The digital processing unit 12 then receives the G signal composited image and the reference raw image. Conventional demosaicing processing is then performed on the reference raw image, thus obtaining R, and B data for all of the pixels. Also, the G signal composited image is used as the high-frequency component in edge enhancement processing. Even with such a processing procedure, it is possible to realize a greater increase in resolution than the case of performing conventional digital processing.

In the present embodiment, when the image compositing unit 11 composites two images, image peripheral portions lacking pixel data from the other image, that is to say, compositing blank portions exist in the composited image. The resolution may be increased by, for example, performing interpolation processing on such portions.

2. Other Embodiments

Note that the blocks in the imaging apparatus described in the above embodiment may be individually configured as a single chip by a semiconductor apparatus such as an LSI, and a configuration is possible in which a portion or all of the blocks are configured as a single chip. Although an LSI has been referred to here, an integrated chip may also be referred to as an IC, a system LSI, a super LSI, or an ultra LSI, depending on the degree of integration. The circuit integration technique is also not limited to LSI, but instead may be realized by a dedicated circuit or a general-purpose processor. An FPGA (Field Programmable Gate Array) that is programmable after LSI manufacture or a reconfigurable processor in which the connection and settings of circuit cells in the LSI can be restructured may be used. Furthermore, if circuit integration technology that replaces LSIs is developed due to progressive or derivative semiconductor technology, integration of functional blocks using this technology is of course possible. Also, the various processing in the above embodiment may be realized by hardware, or may be realized by software. Furthermore, such processing may be realized by a combination of software and hardware.

Note that specific configurations of the present invention are not limited to the above-described embodiments, and various modifications and corrections can be made without departing from the spirit of the invention. For example, there is no limitation to the image processing procedure shown in FIG. 2.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "portion," or "element" when used in the singular can have the dual meaning of a single part or a plurality of parts. Also as used herein to describe the above embodiment(s), the following directional terms "above", "vertical", "horizontal" and "below" as well as any other similar directional terms refer to those directions of the imaging apparatus, these terms, as utilized to describe the present invention should be interpreted relative to the imaging apparatus.

The term "configured" as used herein to describe a component, section, or part of an apparatus implies the existence of other unclaimed or unmentioned components, sections, members or parts of the apparatus to carry out a desired function.

The terms of degree such as "substantially" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An imaging apparatus comprising:
    an imaging element including a plurality of first pixels that measure the amount of light of a first color that has been received by the first pixels and a plurality of second pixels that measure the amount of light of a second color that has been received by the second pixels, the first pixels and the second pixels being arranged in a predetermined pattern, the imaging element being configured to generate image data in which an object has been imaged, the image data having at least one of first color information regarding the first color and second color information regarding the second color;
    an image selection unit configured to select, from among a plurality of image data pieces of the image data, a first image data piece and a second image data piece in which a position of the object is shifted by a predetermined amount relative to a position of the object imaged in the first image data piece; and
    an image compositing unit configured to generate composited image data by compositing the first image data piece and the second image data piece based on the predetermined amount;
    wherein the image selection unit selects, as the second image data piece, an image data piece generated with light from the object that is received via the first pixels of the imaging element and received via the second pixels of the imaging element for generating the first image data piece;

the first pixels are arranged alternately in both horizontal and vertical directions of the imaging element; and the image selection unit selects, as the first image data piece and the second image data piece, a pair of image data pieces among the plurality of image data pieces, the pair of image data pieces having a smallest value for an evaluation value D when the following expressions are satisfied, where dx represents a horizontal distance component between a position of the object imaged in one of the pair of image data pieces and a position of the object imaged in the other of the pair of image data pieces, and dy represents a vertical distance component between the positions:

$dx=2m+1+a, dy=2n+b (m,n:\text{integer}, -0.5<a,b<0.5)$ or $dx=2m+a, dy=2n+1+b (m,n:\text{integer}, -0.5<a,b<0.5)$; and $D=(a^2+b^2)^{0.5}$.

2. The imaging apparatus according to claim 1, wherein:
when having determined that the evaluation value D is greater than a threshold value Th1, the image compositing unit interpolates the second image data piece using some or all of the plurality of image data pieces including the second image data piece, and then composite the first image data piece and the interpolated second image data piece to generate the composited image data.

3. The imaging apparatus according to claim 1, further comprising:
a display unit configured to be controlled by the image compositing unit such that the display unit displays an error when the image selection unit has not selected the first image data piece and the second image data piece.

4. The imaging apparatus according to claim 2, further comprising:
a display unit configured to be controlled by the image compositing unit such that the display unit displays an error when the image compositing unit has determined that the evaluation value D is greater than a threshold value Th2 that is greater than the threshold value Th1.

5. The imaging apparatus according to claim 1, wherein:
the first color information is green, and
the second color information is at least one of red and blue.

6. An imaging apparatus comprising:
an imaging element including a plurality of first pixels that measure the amount of light of a first color that has been received by the first pixels and a plurality of second pixels that measure the amount of light of a second color that has been received by the second pixels, the first pixels and the second pixels being arranged in a predetermined pattern, the imaging element being configured to generate image data in which an object has been imaged, the image data having at least one of first color information regarding the first color and second color information regarding the second color; and an image compositing unit configured to generate composited image data by compositing two image data pieces selected from among a plurality of image data pieces generated by the imaging element, without interpolation processing, in which a position of the object imaged in one of the two image data pieces is shifted by a predetermined amount relative to a position of the object imaged in the other of the two image data pieces;

wherein the first pixels are arranged alternately in both horizontal and vertical directions of the imaging element; and the image selection unit selects, as a first image data piece and a second image data piece, a pair of image data pieces among the plurality of image data pieces, the pair of image data pieces having a smallest value for an evaluation value D when the following expressions are satisfied, where dx represents a horizontal distance component between a position of the object imaged in one of the pair of image data pieces and a position of the object imaged in the other of the pair of image data pieces, and dy represents a vertical distance component between the positions:

$dx=2m+1+a, dy=2n+b (m,n:\text{integer}, -0.5<a,b<0.5)$ or $dx=2m+a, dy=2n+1+b (m,n:\text{integer}, -0.5<a,b<0.5)$; and $D=(a^2+b^2)^{0.5}$.

7. An integrated circuit used in an imaging apparatus including an imaging element having a plurality of first pixels that measure the amount of light of a first color that has been received by the first pixels and a plurality of second pixels that measure the amount of light of a second color that has been received by the second pixels, the first pixels and the second pixels being arranged in a predetermined pattern, the integrated circuit comprising:

an image selection unit configured to select, from among a plurality of image data pieces in which an object has been imaged, a first image data piece and a second image data piece in which a position of the object is shifted by a predetermined amount relative to a position of the object imaged in the first image data piece, the plurality of image data pieces having at least one of first color information regarding the first color and second color information regarding the second color; and an image compositing unit configured to generate composited image data by compositing the first image data piece and the second image data piece based on the predetermined amount, wherein the image selection unit selects, as the second image data piece, an image data piece generated with light from the object that is received via the first pixels of the imaging element and received via the second pixels of the imaging element for generating the first image data piece;

the first pixels are arranged alternately in both horizontal and vertical directions of the imaging element; and the image selection unit selects, as the first image data piece and the second image data piece, a pair of image data pieces among the plurality of image data pieces, the pair of image data pieces having a smallest value for an evaluation value D when the following expressions are satisfied, where dx represents a horizontal distance component between a position of the object imaged in one of the pair of image data pieces and a position of the object imaged in the other of the pair of image data pieces, and dy represents a vertical distance component between the positions:

$dx=2m+1+a, dy=2n+b (m,n:\text{integer}, -0.5<a,b<0.5)$ or $dx=2m+a, dy=2n+1+b (m,n:\text{integer}, -0.5<a,b<0.5)$; and $D=(a^2+b^2)^{0.5}$.

8. An image processing method used with an imaging apparatus including an imaging element having a plurality of first pixels that measure the amount of light of a first color that has been received by the first pixels and a plurality of second pixels that measure the amount of light of a second color that has been received by the second pixels, the first pixels and the second pixels being arranged in a predetermined pattern, the image processing method comprising:

- generating image data in which an object has been imaged, the image data having at least one of first color information regarding the first color and second color information regarding the second color, using the imaging element;
- selecting, from among a plurality of image data pieces of the image data, a first image data piece and a second image data piece in which a position of the object is shifted by a predetermined amount relative to a position of the object imaged in the first image data piece; and
- generating composited image data by compositing the first image data piece and the second image data piece based on the predetermined amount,
- wherein, in the selecting of the first image data piece and the second image data piece, selected as the second image data piece is an image data piece generated with light from the object that is received via the first pixels of the imaging element and received via the second pixels of the imaging element for generating the first image data piece;
- the first pixels arranged alternately in both horizontal and vertical directions of the imaging element; and
- selecting, as the first image data piece and the second image data piece, a pair of image data pieces among the plurality of image data pieces, the pair of image data pieces having a smallest value for an evaluation value D when the following expressions are satisfied, where dx re resents a horizontal distance component between a position of the object imaged in one of the pair of image data pieces and a position of the object imaged in the other of the pair of image data pieces, and dy represents a vertical distance component between the positions:

$$dx=2m+1+a, dy=2n+b (m,n:\text{integer},-0.5<a,b<0.5) \text{ or}$$

$$dx=2m+a, dy=2n+1+b (m,n:\text{integer},-0.5<a,b<0.5);$$
and $$D=(a^2+b^2)^{0.5}.$$

* * * * *